(12) United States Patent
Akiyama et al.

(10) Patent No.: US 7,077,485 B2
(45) Date of Patent: Jul. 18, 2006

(54) RUBBER CRAWLER

(75) Inventors: Hitoshi Akiyama, Fujisawa (JP); Eiji Tsuru, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 29 days.

(21) Appl. No.: 10/433,774

(22) PCT Filed: Dec. 4, 2001

(86) PCT No.: PCT/JP01/10583

§ 371 (c)(1),
(2), (4) Date: Jun. 6, 2003

(87) PCT Pub. No.: WO02/46029

PCT Pub. Date: Jun. 13, 2002

(65) Prior Publication Data

US 2004/0066090 A1    Apr. 8, 2004

(30) Foreign Application Priority Data

Dec. 7, 2000    (JP) ............................. 2000-372364

(51) Int. Cl.
*B62D 55/26*    (2006.01)
(52) U.S. Cl. ...................... 305/178; 305/165
(58) Field of Classification Search ............... 305/157, 305/158, 160, 165, 166, 167, 169, 170, 178, 305/179, 180, 184
See application file for complete search history.

(56) References Cited

U.S. PATENT DOCUMENTS

| 6,065,818 A * | 5/2000 | Fischer ...................... 305/179 |
| 6,106,083 A * | 8/2000 | Ono ........................... 305/171 |
| 6,241,327 B1 * | 6/2001 | Gleasman et al. ............ 305/157 |
| 6,422,666 B1 * | 7/2002 | Choi ........................... 305/178 |
| 6,568,769 B1 * | 5/2003 | Watanabe et al. ............ 305/171 |
| 6,652,044 B1 * | 11/2003 | Katoh et al. ................. 305/165 |
| 2001/0003403 A1 * | 6/2001 | Lussier ....................... 305/178 |

FOREIGN PATENT DOCUMENTS

| JP | 57-95271 | * | 9/1971 |
| JP | 52-2925 | * | 1/1977 |
| JP | 55-72469 | * | 5/1980 |
| JP | 55-145071 | * | 11/1980 |
| JP | 55-145072 | * | 11/1980 |
| JP | 57-19347 | Y2 | 4/1982 |
| JP | 57-160775 | * | 4/1982 |
| JP | 61-27347 | Y2 | 8/1986 |
| JP | 2-135383 | U | 11/1990 |
| JP | 5-56772 | U | 7/1993 |
| JP | 05-278647 | A | 10/1993 |
| JP | 2555195 | Y2 | 8/1997 |
| JP | 9-249163 | A | 9/1997 |
| JP | 2000-128036 | A | 5/2000 |
| JP | 2000-177658 | A | 6/2000 |

* cited by examiner

Primary Examiner—Russell D. Stormer
(74) Attorney, Agent, or Firm—Sughrue Mion, PLLC

(57) ABSTRACT

A core-less rubber crawler has a guide protrusion protruding from an internal surface of a rubber main body in the shape of an endless belt, and the protrusion extends in the lengthwise direction of the rubber main body at the center with respect to the widthwise direction thereof, and ground contacting lugs are provided on the rubber main body characterized in that non-ground contacting areas are formed on the ground contacting lugs correspondingly to a region where the guide protrusion is provided. By the existence of the non-ground contacting area of the ground contacting lugs correspondingly to the place where the guide protrusion is provided, no ground contacting repulsive force is received in the non-ground contacting area. Therefore, it is possible to restrict the shearing force in the vicinity of the basal part of the guide protrusion.

7 Claims, 3 Drawing Sheets

W: Load of Wheel
a: Width of Wheel
b: Width of Guide Protrusion

PRIOR ART

FIG. 4C  SFD (Shear Force Diagram)

PRIOR ART $F = (\omega_0 - \omega_1) \times a$

RUBBER CRAWLER

BACKGROUND OF THE INVENTION

1. Technical Field of the Invention

The present invention relates to a core-less rubber crawler having a rubber main body in the shape of an endless belt, wherein a guide protrusion is provided on an internal surface of the rubber main body so as to protrude at a center part of the rubber main body, and a ground contacting lug protrudes on an external surface of the rubber main body.

2. Background Art

A core-less-type rubber crawler is widely used since it has a simple structure and is of low cost. The rubber crawler is structured to be driven by a friction drive between a rubber main body in the shape of an endless belt and a driving wheel or an idle wheel provided on the internal surface of the belt main body.

FIG. 3A is a partial cross-sectional view and a typical example of a conventional core-less-type rubber crawler that will be explained below.

As shown in FIG. 3A, the rubber crawler 11 has a rubber main body 12 extending in a lengthwise direction having a belt shape. A reinforcing cord 15 is embedded in the rubber main body 12 approximately at the intermediate part thereof with respect to the thickness direction. The reinforcing cord 15 is obtained by placing a number of reinforcing filaments side by side and applying a treatment such as gumming thereto. A guide protrusion 13 is provided on the internal surface of the rubber main body 12 in the longitudinal direction along the centerline with respect to the width direction. Furthermore, as shown in of FIG. 3B, the rubber crawler 11 has ground contacting lugs 14A and 14B which protrude from the external surface of the rubber main body, and are alternatively arranged in the left and right side so as to form a zigzag shape.

When the rubber crawler 11 is driven, wheels 17A and 17B such as driving wheels, idle wheels, or tracker wheels roll on the internal surface of the rubber main body 12 at the left and right sides of the guide protrusions 13 provided thereon. In this case, as shown in FIG. 3A, the wheels receive the dispersed load of the vehicle, and the weight of the wheels is perpendicularly applied to the rubber main body 12 on both sides of the guide protrusion 13, in the rubber crawler 11. Thus, the engagement of the wheels with the rubber crawler and the detachment of these are repeatedly performed with generating moment as shown by arrows A. As a result, expansion and contraction in the direction shown by arrows B are continuously repeated in the range of the guide protrusion 13 and a rubber main body 12. Here, a large weight of wheels is applied to the rubber main body 12 at both sides of the guide protrusion 13. Accordingly, the reinforcing cord 15 embedded in the rubber main body 12 is repeatedly subjected to deformation within the rubber main body 12. As a result, it is possible that cracks as shown by arrows C are formed in the vicinity of the basal part of the guide protrusion 13.

FIGS. 4A to 4C are diagrams for briefly explaining a crack generating mechanism at the basal part of the guide protrusion 13 in a conventional rubber crawler. FIG. 4A is a partial cross-section of a conventional rubber crawler.

In FIG. 4A, w represents the load of a wheel, a represents the width of the wheel, and b represents the width of the guide protrusion. The other members or parts are indicated by use of symbols in common with those in FIG. 3A.

FIG. 4B shows a left end of the rubber main body 12 as a reference point x=0, a left basal part of the guide protrusion 12 as a point $x=1_1$, a right basal part as a point $x=1_2$, and a right end of the rubber main body as a point $x=1_3$ in the rubber crawler. Then, the shearing force variation at the points is analyzed.

Concerning load $\omega$ per unit length which receives the load of the wheel, a load $\omega_1=(w/2)\div 1_1=w/(2a)$ when x=0 to $1_1$, and a load $\omega_2=(w/2)\div(1_3-1_2)=w/(2a)$ when $x=1_2$ to $1_3$. The load $\omega$ in FIG. 4B is shown by numbers of downward arrows on the upper part of a reference plane p–p' (ground contacting plane).

On the other hand, a repulsive force $\omega_0$, which the ground contacting lugs 14A and 14B of a rubber crawler receives based on the load of the wheel, is shown as $\omega_0=w/1_3=w/(2a+b)$ when x=0 to $1_3$. The repulsive force $\omega_0$ in FIG. 4B is shown by numbers of upward arrows on the lower part of the reference plane p–p'.

The difference between the load $\omega$ and the repulsive force $\omega_0$ based on the weight of the wheel w produces the shearing force at the parts of x=0 to $1_3$ as shown in FIG. 4C. The shearing force in the range from x=0 to $1_1$ is linearly increased from $F1_0=0$ to $F1_1=(\omega_0-\omega_1)\times a$, and the shearing force in the range of $1_1$ to $1_2$ is $F(1_1+1_2)=0$ since only the repulsive force from the ground surface affects in this range. Then, it can be seen that the shearing force in the range of from $x=1_2$ to $1_3$ linearly decreases from $F1_2=(\omega_0-\omega_1)\times a-\omega_0 b$ to $F1_3=0$.

It is therefore the object of the present invention to provide a rubber crawler for solving the above-mentioned conventional problem, and which effectively prevents the crack from generating by the shearing force restriction at the basal part of the guide protrusion.

SUMMARY OF THE INVENTION

To achieve the above-mentioned object, a core-less rubber crawler is used which has a rubber main body in the shape of an endless belt, a guide protrusion on an internal surface of the rubber main body, the guide protrusion extending in a lengthwise direction of the rubber main body at a center with respect to a width direction of the rubber main body, and a ground contacting lug protruding from an external surface of the rubber main body, the ground contacting lug having a non-ground contacting area at a part corresponding to the center of the ground contacting lug with respect to the width direction of the rubber main body. Accordingly, it is possible to prevent crack generation on the rubber main body in the vicinity of the basal part of the guide protrusion.

It is preferable that the above-mentioned non-ground contacting area of the ground-contacting lug corresponds to a region where the guide protrusion is placed, and that the non-ground contacting area is formed so as to have an approximately same width as that of the guide protrusion.

The non-ground contacting area of the ground-contacting lug can be formed by preparing the protrusion to have a lower protruding height from the external surface of the rubber main body.

Moreover, when the rubber crawler further comprises a reinforcing cord embedded in the rubber main body in the shape of an endless belt, extending in the lengthwise direction of the rubber main body, the hardness of the rubber main body is increased.

It is also possible that the rubber crawler of the present invention has the guide protrusion composed of a plurality of protruding parts provided in the lengthwise direction of the rubber main body having a predetermined interval therebetween. Moreover, it is possible that the ground-contacting lug is composed of a plurality of lug parts provided in the lengthwise direction of the rubber main body having a predetermined interval therebetween. By providing the protruding parts, or the lug parts, or both parts having a predetermined interval between the respective parts, the rubber crawler smoothly surrounds the wheels.

BRIEF DESCRIPTION OF THE DRAWINGS

FIG. 4C is a shear force diagram (SFD) of FIG. 4B.

DETAILED DESCRIPTION OF ILLUSTRATIVE, NON-LIMITING EMBODIMENTS OF THE INVENTION

Figure 1:
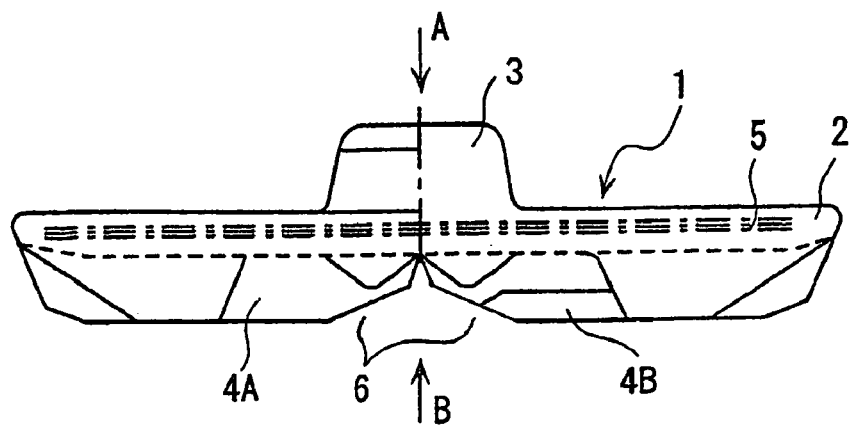
FIG. 1 is a cross-section for showing an embodiment of a rubber crawler of the present invention.
Figure 2:
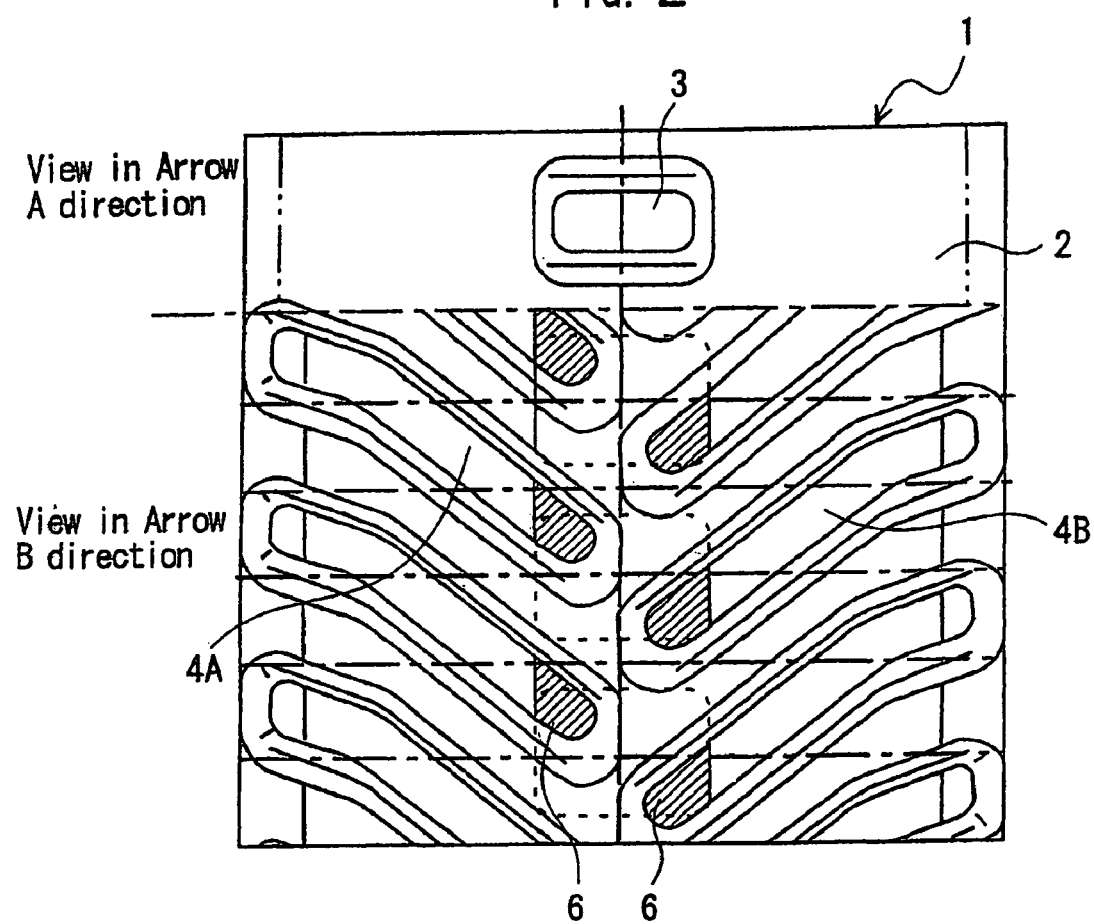
FIG. 2 is a diagram for explaining a rubber crawler of the present invention.
Figure 3A:
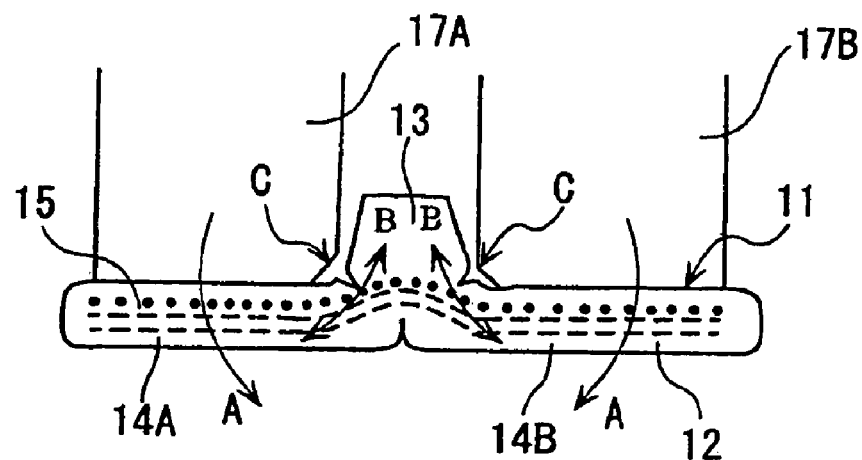
FIG. 3A is a partial cross-section of a conventional rubber crawler for explaining a crack generation state.
Figure 3B:
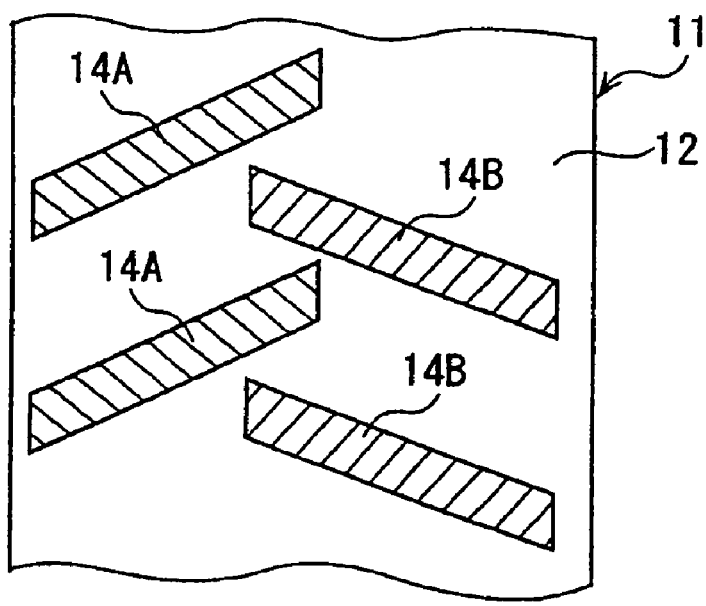
FIG. 3B is a bottom view of a rubber main body on a conventional rubber crawler.
Figure 4A:
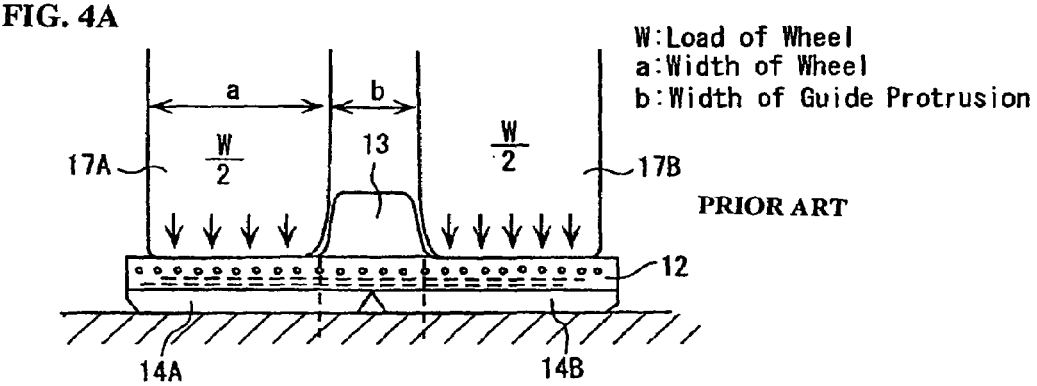
FIG. 4A is a partial cross-section of the rubber crawler for explaining shearing force variation of a conventional rubber crawler.
Figure 4B:
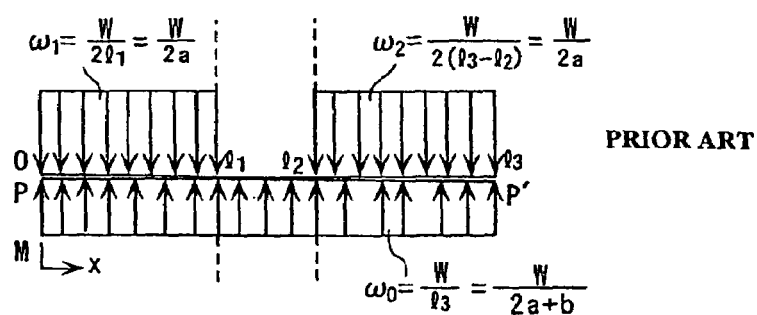
FIG. 4B is a diagram for explaining a relationship between the load and repulsive force at a ground contacting part of the rubber crawler of FIG. 4A.
Figure 4B:
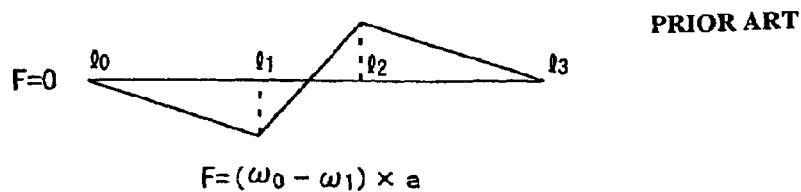

An embodiment of a rubber crawler according to the present invention will now be explained by referring to the figures. FIG. 1 is a cross-section of a rubber crawler as an embodiment of the present invention at a lower part thereof. FIG. 2 contains figure A showing the rubber crawler viewed in the direction of an arrow A in FIG. 1 and figure B showing the rubber crawler viewed in the direction of an arrow B therein.

FIGS. 1 and 2 show a core-less rubber crawler 1 of the present invention. As can be seen from the figures, a guide protrusion 3 protrudes from the internal surface of the rubber main body 2 so as to be provided in the lengthwise direction of the main body at the center with respect to the width thereof. Furthermore, ground contacting lugs 4A and 4B have non-ground contacting areas 6, 6 formed corresponding to a region where the guide protrusion 3 is placed. The non-ground contacting areas 6,6 are shown shaded with oblique lines in FIG. 2.

In a preferred embodiment, a reinforcing cord 5 is embedded in the rubber main body 2 in the shape of an endless belt, the reinforcing cord 5 extending in the lengthwise direction of the rubber main body. The reinforcing cord 5 is composed of a main cord extending in the lengthwise direction of the rubber main body, a bias cord extending in the inclined direction and the like, thereby increasing the driving resistance and widthwise hardness or the like.

Furthermore, the guide protrusion 3 may be formed as a plurality of protruding parts, and the ground contacting lugs 4A and 4B may be formed as a plurality of lug parts, and either of or both of the guide protrusion 3 and the ground contacting lugs 4A and 4B may be provided with a predetermined interval therebetween in the lengthwise direction of the rubber main body 2.

In FIG. 2, both the guide protrusion 3 and the ground contacting lugs 4A and 4B are provided so as to have a predetermined interval therebetween, respectively. However, as an alternative, it is possible to provide the guide protrusion 3 as convex stripes continuously formed in the lengthwise direction. In addition, it is also possible to form the ground contacting lugs 4A and 4B as continuous, inclined zigzag stripes with respect to each other.

At all events, it is possible to prepare the non-ground contacting areas 6,6 by forming parts of the ground contacting lugs 4A and 4B so as to correspond to a region of the guide protrusion 3 (a region with oblique lines in FIG. 2) and not to contact the ground. In other words, it is possible to prepare the non-ground contacting areas 6,6 by forming the parts of the ground contacting lugs so as to correspond to a back surface of the central guide protrusion 3 extending or dotted in the lengthwise direction of the rubber main body at the center part with respect to the width, and not to contact the ground. In this way, the non-ground contacting areas 6,6 can be formed when ground contacting lugs 4A and 4B are initially formed. Alternatively, it is possible to prepare the non-ground contacting areas by cutting the corresponding parts of the ground contacting lugs. It is preferable that the non-ground contacting areas are prepared by eliminating a range far beyond the width of the guide protrusion.

Non-ground contacting areas 6 can be formed to have a cross-section with inclination as shown in FIG. 1, or can be formed as a horizontal surface which protrudes to be lower than the other portions of the lugs by the formation of step parts or the like (not shown).

Because the non-ground contacting areas 6,6 exist on the ground contacting lugs 4A, 4B corresponding to the region where the guide protrusion 3 is provided, there is no ground contacting repulsive force from the non-ground contacting area 6. The value $\omega_0-\omega_1$ will be smaller. Therefore, the generation of the shearing force near the basal part of the guide protrusion 3 is restricted. Thus, it is possible to effectively prevent the crack generation in the vicinity of the basal part of the guide protrusion 13.

As mentioned above, a core-less rubber crawler of the invention has a rubber main body in the shape of an endless belt, a guide protrusion on an internal surface of the rubber main body, extending in a lengthwise direction of the rubber main body at a center with respect to a width direction of the rubber main body, and a ground contacting lug protruded on an external surface of the rubber main body, wherein the ground contacting has a non-ground contacting area corresponding to a center with respect to a width direction of the rubber main body. Therefore, no ground contacting repulsive force is received from a non-ground contacting area, and hence it is possible to prevent the crack generation at a basal part of a guide protrusion of a rubber crawler.

Moreover, when a reinforcing cord is embedded in the rubber main body in the form of an endless belt in the lengthwise direction thereof, the driving durability and the widthwise hardness of the rubber main body are increased with the aid of the shearing force restriction in the vicinity of the basal part of the guide protrusion. Thus, it is possible for the rubber crawler to sufficiently exhibit durability performance.

In addition to the above, the rubber crawler smoothly surrounds wheels when either of or both of the guide protrusion and the ground contacting lug is/are positioned with a predetermined interval therebetween in the lengthwise direction of the rubber main body. Therefore, it is possible to certainly prevent the crack generation in the vicinity of the basal part of ground contacting lug by restricting the tensile stress.

As can seen from the above, a rubber crawler is provided according to the present invention which effectively prevents the crack generation by restricting the shearing force to be generated in the vicinity of the basal part of the guide protrusion.

The present invention was explained above in detail based on the embodiment. The invention can be appropriately modified within the spirit and scope of the invention. For instance, modification can be applied to the shape of the rubber crawler, the material thereof, the driving arrangement of the rubber crawler as a contacting configuration of the rubber crawler with wheels, the type of reinforcing cord containing a main cord and a bias cord such as the twisting form of the cord or the like, the material of such cords, the manner of gumming, the installation angle of cords, the embedding location of such reinforcing cords, the shape of a guide protrusion, the shape of a ground contacting lug, the quantity of the non-ground contacting area to be cut such as cutting width, as well as the cutting shape or cutting depth of a non-ground contacting area.

The invention claimed is:

1. A core-less rubber crawler comprising:
a rubber main body in the shape of an endless belt;
a guide protrusion provided on an internal surface of said rubber main body, said guide protrusion extending in a lengthwise direction of said rubber main body at the center with respect to a width direction of said rubber main body; and
pairs of ground contacting lugs protruding from an external surface of said rubber main body, said ground contacting lugs including ground contacting areas and non-ground contacting areas and including chamfered edges, said chamfered edges forming said non-ground contacting areas, said non-ground contacting areas being configured so as to be closer to the rubber main body than said ground contacting areas, said non-ground contacting areas formed to correspond to the center of said rubber main body in a widthwise direction of the rubber main body, said non-ground contacting areas of said ground contacting lugs correspond to a region where said guide protrusion is located, said non-ground contacting areas extending over the width of said guide protrusion.

2. The rubber crawler as claimed in claim 1, further comprising a reinforcing cord embedded in said rubber main body in the shape of an endless belt, and said reinforcing cord extending in a lengthwise direction of said rubber main body.

3. The rubber crawler as claimed in claim 2, wherein said guide protrusion is composed of a plurality of protruding parts provided in the lengthwise direction of said rubber main body with a predetermined interval therebetween.

4. The rubber crawler as claimed in claim 2, wherein said pairs of said ground contacting lugs are provided in the lengthwise direction of said rubber main body with a predetermined interval therebetween.

5. The rubber crawler as claimed in claim 1, wherein said guide protrusion is composed of a plurality of protruding parts provided in the lengthwise direction of said rubber main body with a predetermined interval therebetween.

6. The rubber crawler as claimed in claim 5, wherein said pairs of said ground contacting lugs are provided in the lengthwise direction of said rubber main body with a predetermined interval therebetween.

7. The rubber crawler as claimed in claim 1, wherein said pairs of said ground contacting lugs are provided in the lengthwise direction of said rubber main body with a predetermined interval therebetween.

* * * * *